US008189858B2

(12) United States Patent  
Lubin

(10) Patent No.: US 8,189,858 B2  
(45) Date of Patent: May 29, 2012

(54) DIGITAL WATERMARKING WITH SPATIOTEMPORAL MASKING

(75) Inventor: Jeffrey Lubin, Princeton, NJ (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 645 days.

(21) Appl. No.: 12/430,354

(22) Filed: Apr. 27, 2009

(65) Prior Publication Data

US 2009/0208008 A1  Aug. 20, 2009

(51) Int. Cl.  
*G06K 9/00* (2006.01)  
*H04N 7/167* (2011.01)

(52) U.S. Cl. .......................................... 382/100; 380/205

(58) Field of Classification Search .................. 382/100, 382/232; 380/51, 54, 205, 210, 252, 287; 370/522–527; 283/72, 74–81, 85, 901; 713/176, 713/179; 358/3.28  
See application file for complete search history.

(56) References Cited

U.S. PATENT DOCUMENTS

| | | | | |
|---|---|---|---|---|
| 6,633,654 | B2* | 10/2003 | Hannigan et al. | 382/100 |
| 7,088,844 | B2* | 8/2006 | Hannigan et al. | 382/100 |
| 7,283,643 | B2* | 10/2007 | Nguyen | 382/100 |
| 7,483,547 | B2 | 1/2009 | Hannigan | |
| 7,697,719 | B2* | 4/2010 | Rhoads | 382/100 |
| 2004/0013284 | A1 | 1/2004 | Yu | |

OTHER PUBLICATIONS

B.G. Cleland, M.W. Dublin and W.R. Levick, "Sustained and Transient neurones in the cat's retina and lateral Geniculate Nucleus", Apr. 13, 1971, J. Physiol, (1971), 217, pp. 473-496, Department of Physiology, John Curtin School of Medical Research, Australian National University, Canberra, Australia, 2601.

R.E Fredericksen, R. F. Hess, "Estimatin Multiple Temporal Mechanisms in Human Vision", Vision Res., vol. 38, No. 7, pp. 1023-1040, 1998, Elsevier Scienece Ltd., Great Britain.

* cited by examiner

Primary Examiner — Abolfazl Tabatabai  
(74) Attorney, Agent, or Firm — Lawrence Goerke

(57) ABSTRACT

Visually imperceptible distortion, from watermarking or compression, desired for embedding into frames of a video sequence is computed. Within each spatiotemporal region of the frames, points are counted, which have feature information amplitude that at least equals the desired distortion. In each region, a fraction of the points with magnitudes at least equal to desired distortion is determined, in relation to the total number of points and compared to a threshold. Regions with fractions at least equal to the threshold are identified. Visual aspects of features in the identified regions are analyzed for salience related to drawing visual attention. The salience is compared to a threshold. Identified regions that do not exceed the salience threshold may be selected as candidates for hiding the watermark. Spatial and temporal contrast values may relate to the salience, as well as luminance values computed therewith.

22 Claims, 3 Drawing Sheets

Example Process Flow 300

DIGITAL WATERMARKING WITH SPATIOTEMPORAL MASKING

TECHNOLOGY

The present invention relates generally to digital signal processing. More specifically, embodiments of the present invention relate to digital watermarking with spatiotemporal masking.

BACKGROUND

The ability of a local region of an image or sequence to hide feature information may be referred to herein as "masking." Quantifying the ability of a local region of an image or sequence to hide feature information has been an ongoing topic of interest in both academic vision research and in the engineering literature, particularly in the fields of watermarking and image/video compression, for which it is generally desirable to modify input sequences in ways that produce no human perceivable visible distortions.

Conventional or typical approaches to masking computations may involve the summing of feature energies (e.g., the squared output of oriented filters) over each local spatial or spatiotemporal region. However, these approaches may tend to generate predictions of high "maskability" (e.g., the ability to achieve masking) in regions near strong edges in the scene. These edges may tend to be highly salient to some (e.g., most) viewers, in a sense that the edges may attract visual fixations that can make it easier for viewers to see the distortions. This can be especially significant where there are uniform image areas near enough to a salient edge to be included within the masking computation's summing region for that edge. As used herein, the terms "salience," "salient" and the like may relate to a trait or feature of visible, or visually enhancing prominence, conspicuousness, or "standing out," e.g., from a visually perceivable background.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
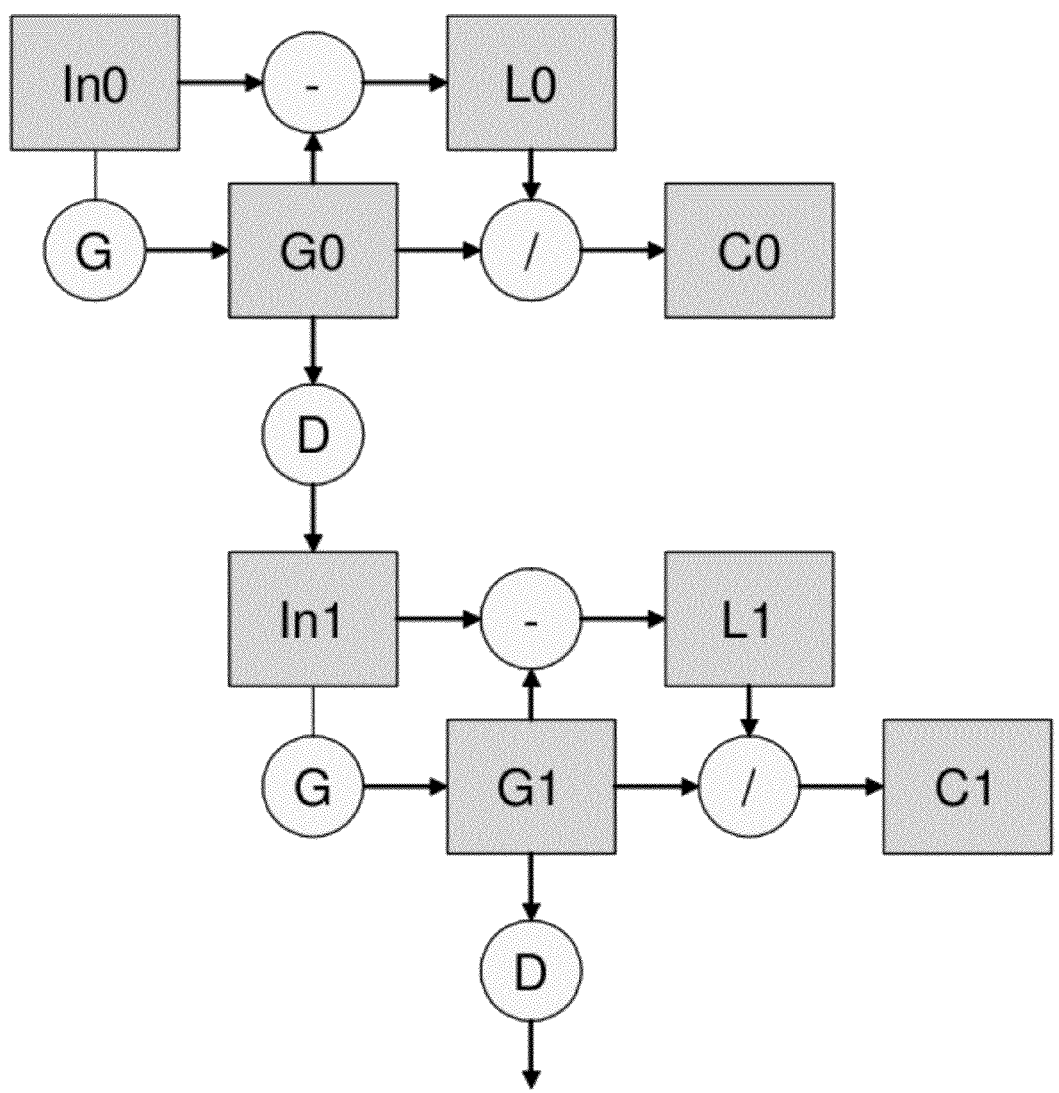
FIG. 1 depicts process flow through an example contrast computation over two frequency bands, according to an embodiment of the present invention.

Digital watermarking with spatiotemporal masking is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

I. Overview

Example embodiments described herein relate to digital watermarking with spatiotemporal masking. Locations within images or within regions of a video frame have features, which are each associated with an energy. An example embodiment computes, within an image or frame region, a number of locations with an energy associated with a feature thereof that approximate or are similar to a desired mark distortion level. The location features may resemble or approximate the desired mark distortion in magnitude and/or type. While conventional approaches may sum energies, example embodiments of the present invention hide a mark feature within an image or frame region in which a significant number of similar features already exist.

In an example embodiment, a magnitude of acceptable distortion is computed over each local spatiotemporal region of a video sequence. The distortion may result from processes such as watermarking or video compression. The distortion is computed so as to be likely imperceptible to most human viewers in, e.g., in most, all or effectively all typical viewing instances of a video sequence.

Within each local spatiotemporal region, an example embodiment thus counts the number of points that have feature information energy amplitudes that are greater than or equal to the desired amplitude of similar feature information to be produced by the distortion generating marking process. For a given amplitude, if this number of points is greater than a specified threshold (e.g., half the number of points in the local region), the distortion is predicted to be visually imperceptible, e.g., invisible to human viewers of the sequence (e.g., with essentially normal vision and under typical or experimental viewing conditions).

In an example embodiment, separate feature analyses are performed for spatial and temporal aspects of the desired distorting features. In an example embodiment, a salience process further rejects regions within which visual attention is most likely to be directed.

A complementary, additional or alternative example embodiment of the present invention relates to rejecting image or frame regions, which a separate salience computation has indicated may be associated with a relatively heightened likelihood of human perceptual attention being drawn thereto. For example, even for image or frame regions that may have an ample number of features to hide the intended distortion, a high value on the salience computation may reduce the region's desirability value; direct fixation on a distorted region may perceptually highlight distortions that may otherwise have remained hidden to the viewer.

II. Example Embodiments

In an example embodiment, a masking process takes in frames of digital video and generates, for each input frame, an amplitude map, which indicates an amount of distortion that may be tolerable for each local spatial region. As used herein, the terms "maskability," maskability value," and the like may relate to the tolerable distortion. The amplitude map predicts a maximum amplitude, e.g., a peak-to-trough grayscale range, over the frame for a spatiotemporal mark, such that the mark remains unperceivable or unnoticeable to a viewer of the video content into which the mark has been inserted.

In an example embodiment, a visual feature analysis stage begins the process of performing the maskability computation. In the feature analysis stage, an incoming video sequence is decomposed into a set of features that relate to visual perception. Visibility of signal features and distortions may thus be compared in perceptually relevant terms.

Different variants of visual features may be used. To simplify computations and economize on processing, memory and related resources, features may be implemented as sensitivity-weighted spatial and temporal contrast values at one or more different spatial scales. In the maskability computation stage, these contrast values are compared, at each local spatial and temporal region, to the characteristics of the mark to be inserted. A maximum mark amplitude may thus be returned, which has a maskability value that minimizes visibility of the mark, e.g., the probability that the mark will be perceived.

A. Example Visual Feature Analysis Stage

In an example embodiment, the visual feature analysis stage functions as though human viewers have two primary paths of visual information. The primary visual paths may be referred to, e.g., by those skilled in arts relating to psychovisual engineering, physiology and psychology of perception, opthalmology, and video and signal processing technology, as "sustained" and "transient" channels. Sustained and transient channels are described in Cleland, Dubin, and Levick, *Sustained and Transient Neurones in the Cat's Retina and Lateral Geniculate Nucleus, Journal of Physiology*, September 1971, 217(2): 473-496, which is incorporated herein by reference for background material. As discussed therein, normal visual systems in humans (and other mammals) have a sustained foveal system with spatially band-pass filter response, a transient system with temporally low-pass response, and an extra-foveal system with spatially low-pass and temporally band-pass response. An embodiment computes both spatial and temporal contrasts, because both may thus contribute to mark visibility.

Including a temporal low-pass response into a modeled sustained channel significantly may have a significant blurring effect on moving object features in video sequences, which may be ameliorated with an accurate visual tracking model. Such a tracking model may have significant computational cost and complexity. An embodiment may thus perform spatial processing on each input frame essentially independently.

For example, an embodiment functions to track, across multiple frames, any part of an image feature that is in focus in a current frame. Performing the spatial computation on each frame alone thus essentially simplifies or economizes the tracking model. Spatial and temporal contrast may be computed as described below.

An example embodiment computes spatial contrast, at each pixel location, according to Equation 1 below.

$$C(x, y) = \frac{I(x, y) - G(x, y)}{G(x, y) + adaptLum} \quad \text{(Equation 1.)}$$

In Equation 1, I(x,y) represents a pixel value from the input image, G(x,y) represents the corresponding pixel value from a Gaussian-filtered version of the input image, and adaptLum represents a predetermined adaptive luminance parameter.

FIG. 1 depicts an example flow 100 through a contrast computation over two frequency bands, according to an embodiment of the present invention. An input image In0 is Gaussian filtered (e.g., circled G in FIG. 1). The filtered image is then subtracted (e.g., circled minus sign) from the original image to form a Laplacian image L0. Laplacian image L0 is then divided (e.g., circled division sign in FIG. 1) by Gaussian image G to form a contrast image C0 (a luminance parameter, e.g., adaptLum, may be added to the denominator).

In an embodiment, Gaussian image G0 is down-sampled, such as by a factor of two (2) horizontally and vertically (e.g., circled D in FIG. 1) to form a next lower resolution input image In1. Process 100 may then recursively repeat over the new lower resolution input image In1.

Thus, images whose labels end in 1 (e.g., In1, G1, L1, and C1) are a factor of two smaller in both width and height than the Level 0 images (e.g., In0, G0, L0, and C0). Similarly, images In2, G2, L2, and C2, which may be generated in subsequent recursive stages of the process, may be an additional factor of 2 reduction, e.g., down from the resolution of the images at Level 1. Thus for example, for an input image at a resolution of 640×480 where four (4) levels of contrast images are used, the contrast image at the lowest level C3 will have dimensions 80×60. The temporal contrast calculation is based on established psychophysical models of the temporal response of the human visual system.

An embodiment functions with a filter-based model that accounts for spatiotemporal signal detection in spatiotemporal noise. For example, an embodiment functions with a model as described in Fredericksen and Hess, *Estimating Multiple Temporal Mechanisms in Human Vision, Vision Research*, Vol. 38, No. 7, 1024-1040 (1998), which is incorporated herein by reference for background material. In this model, a second derivative of the generator function is computed according to Equation 2, below.

$$g(t) = \exp[-(\ln(t/\tau)/\sigma)^2] \quad \text{(Equation 2.)}$$

The second derivative of the generator function thus computed provides an adequate temporal filter fit to date from human psychovisual research with example parameter settings of $\tau=0.0377$ and $\sigma=0.6841$.

Figure 2:
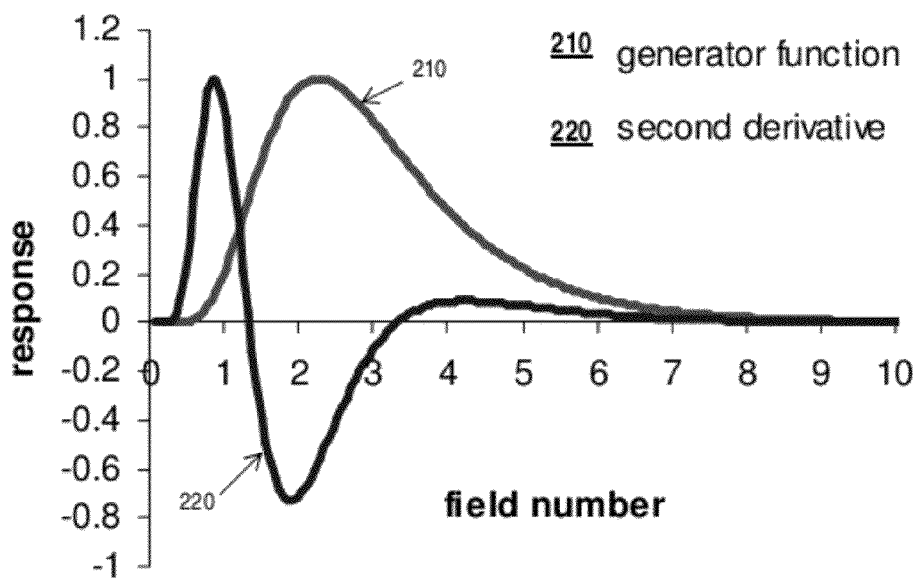
FIG. 2 depicts examples of generator values and second derivatives thereof, plotted according to an embodiment of the present invention.

FIG. 2 depicts example plot 200 of generator values 210 and second derivatives 220 thereof, according to an embodiment of the present invention. The time axis is plotted in units of field number at a 60 Hertz (Hz) field rate. In this implementation, the positive lobe of the second derivative filter has a maximum at a time very close to field 1, while the negative lobe has a minimum very close to field 2. Computer implementations of human visual temporal response have typically relied on multi-stage infinite impulse response (IIR) filters or other sophisticated, relatively intensive computations. An embodiment of the present invention, in contrast, adequately and efficiently implements applications at typical 60 Hz video field rates with a relatively simple computation based, at least in part, on field differencing.

Figure 3:
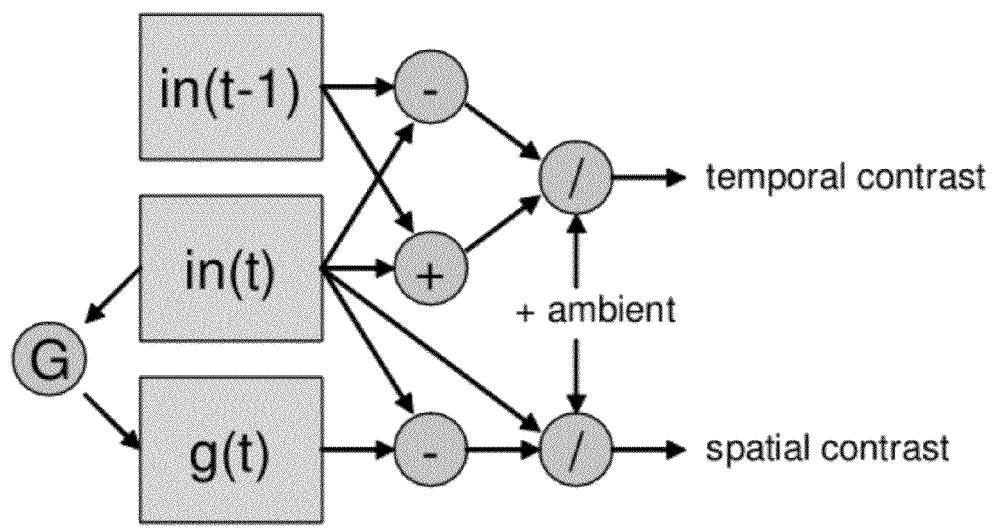
FIG. 3 depicts example process flows for temporal and spatial contrast computations, according to an embodiment of the present invention.

FIG. 3 depicts example process flows 300 for temporal and spatial contrast computations, according to an embodiment of the present invention. The spatial and temporal contrast may be computed over a range, e.g., at each coarseness level. Example process flows 300 show the similarities and differences between the temporal and spatial contrast computations. Here, in(t−1) and in(t) represent two consecutive input fields. For the temporal contrast computation, these two fields are differenced, and this difference divided by the sum of the same two fields, with an additional constant ambient added to the denominator.

For computing spatial contrast, the current input field is blurred by a Gaussian filter G, e.g., as described above. The blurred field is subtracted from the original current input field to form a Laplacian field, which is then divided by the blurred field to produce the spatial contrast map. As in computing temporal contrast, the constant ambient is included in the denominator.

B. Example Maskability Computation Stage

To compute maskability, an embodiment functions to disallow mark placement at a salient location. As used herein, the term salient location may refer to any location that is likely to be scrutinized during typical viewing. Salient location rejection may be provided by a routine that zeroes out both spatial and temporal contrast images at locations in which the spatial contrast has an absolute value that is above a threshold, e.g., a percentile defined by input parameter thresh.

Upon rejecting salient locations in an image or frame, an embodiment functions with a significant component of computing maskability handled to consider a mark feature to be adequately hidden to the extent that the input video already has a large number of other similar features in that region, both spatially and temporally. An embodiment functions independently on both the spatial and temporal contrast maps. Within each defined local spatial region, a number of points are counted on a spatial or temporal contrast image. The points that are counted are those that are above the just noticeable difference (JND) threshold.

For both spatial and temporal maskability computations, one method for computing the amplitude at which a threshold number of points is above that amplitude (and hence the amplitude at which maskability is probable) uses an iterative threshold adjustment routine. That is, for each local region in either the spatial or temporal contrast map, a contrast threshold is lowered, until the number of points above a number threshold is sufficient. Thus, the threshold number of points above which maskability is probable is computed. Separate mark signatures may function to select a single scale at which these computations may be performed for the spatial and temporal pathways. Thus, a pair of maps is generated, which indicate the acceptable number of watermark JNDs at each local region, with spatial and temporal masking considered independently. Each of these JND values is then divided by the JND weight for the appropriate spatial scale, to convert the map from JND units back to contrast units.

After generating these two maps, a routine may be called to convert the contrast units back to grayscale amplitudes, e.g., with an undoing of the contrast computation. An embodiment may achieve this function with multiplication of each contrast value by the sum of the local mean luminance and the adapting luminance. In an embodiment, converting to luminance from the reconstituted grayscale is obviated: default settings thereof may essentially equate luminance values with gray levels.

In an example embodiment, a third masking map may be generated from the local gray levels directly, in addition to the masking map generation routines based on counting spatial and temporal features. For example, the visibility of a signal modulation is proportional to the signal level from which the modulation embarks; a principle familiar to those skilled in arts relating to digital signal processing, watermarking, imaging, and/or video compression in relation to Weber fractions. For the third masking map, a Weber fraction comprises a multiplier on the input gray scale map, which generates a luminance masking map.

Example embodiments of the present invention may thus function with one or more of three masking maps, which may relate to spatial, temporal and luminance masking. An embodiment may combine the three maps into a single maskability value for each spatiotemporal region of an image or frame. To combine the masking maps, a minimum of the predicted amplitudes from each of the three maps may be selected. This selection may relate to the general psychophysical principle that signal visibility across several channels may be accurately modeled with a selection of the output of the most sensitive channel to the signal under consideration.

Some implementations may relate to situations that can arise in practice, in which this selection may not provide an adequate density or amplitude of maskable regions. Under such conditions, any of a variety of somewhat more complex combinations may be used, e.g., additionally or alternatively, as influenced by the desired densities and amplitudes. For example, a set of masking rules that has been experimentally or practically determined in relation to watermark insertion may be to use the maximum of the three map outputs (e.g., except where any of the three map outputs falls below a specified threshold for that map).

III. Equivalents, Extensions, Alternatives and Miscellaneous

Example embodiments for digital watermarking with spatiotemporal masking are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:
    computing a magnitude of a desired distortion, introduced into the frames of a video sequence with at least one of a watermarking process or a compression process;
    within each local spatiotemporal region of the video frames, counting a number of points that have an amplitude of information related to a feature of the regions that at least equal the computed imperceptible distortion magnitude;
    in each of the local spatiotemporal regions, computing a fraction of the points, which have feature information magnitudes that at least equal the computed imperceptible distortion magnitudes, in relation to the total number of points;
    comparing the computed fractions to a specified threshold value; and
    identifying one or more of the local spatiotemporal regions with fractions that equal or exceed the specified threshold value.

2. The method as recited in claim 1 further comprising the steps of: selecting the identified one or more spatiotemporal regions as candidate locations within one or more of the frames for embedding the desired distortion.

3. The method as recited in claim 1 further comprising the steps of:
    analyzing one or more aspects, which relate to visual perception, of at least one feature of each of the identified spatiotemporal regions;
    computing a salience factor for each of the aspects, in relation to a probability of attracting human visual attention therewith;
    comparing the salience factor to a specified salience threshold; and further identifying one or more of the local spatiotemporal regions with salience factors that equal or exceed the specified salience threshold.

4. The method as recited in claim 3 further comprising the step of: selecting, as the candidate locations for embedding the desired distortion, the identified one or more local spatiotemporal regions with salience factors below the specified salience threshold.

5. The method as recited in claim 3 further comprising the step of: rejecting, as the candidate locations for embedding the desired distortion, the identified one or more local spatiotemporal regions with salience factors that equal or exceed the specified salience threshold.

6. The method as recited in claim 3 wherein the feature aspects comprise spatial features.

7. The method as recited in claim 3 wherein the feature aspects comprise temporal features.

8. The method as recited in claim 3 wherein the visually perceivable feature aspects relate to one or more of spatial or temporal contrast.

9. The method as recited in claim 3 wherein the analyzing step comprises the step of: decomposing the frames of the incoming video sequence into a set of the visually perceivable feature aspects.

10. The method as recited in claim 9 wherein the visually perceivable feature aspects comprise spatial or temporal contrast values; and
wherein the visually perceivable feature aspects relate to one or more of spatial or temporal contrast values are weighted in relation to a sensitivity over one or more spatial scales.

11. The method as recited in claim 9, further comprising the step of determining the spatial contrast values.

12. The method as recited in claim 11 wherein determining the spatial contrast values comprises the steps of:
filtering each input field of the video stream to achieve a Gaussian blurring;
computing a Laplacian difference frame between each of the filter-blurred frames and the input field;
computing a proportion between the difference frame and the blurred frame; and
mapping the spatial values over each of the frames based, at least in part, on the computed proportion to generate a map of the spatial contrast values.

13. The method as recited in claim 12, further comprising the step of determining the temporal contrast values.

14. The method as recited in claim 13 wherein determining the temporal contrast values comprises the steps of:
computing a difference between at least two input fields of the video stream;
computing a sum of the at least two input fields; and
computing a proportion of the difference in relation to the sum; and
mapping the temporal values over the input fields based, at least in part, on the computed proportion.

15. The method as recited in claim 14, further comprising the steps of:
computing a mean luminance value for one or more of the mapped local spatiotemporal regions;
computing a sum of the computed mean luminance value and an adaptive luminance parameter;
computing a product of each of the computed sum spatial and temporal contrast values and the sum of the computed mean luminance value and an adaptive luminance parameter; and
mapping a distribution of luminance values over the spatiotemporal regions.

16. The method as recited in claim 14, further comprising the step of: comparing the mapped spatial contrast values, temporal contrast values, and luminance values.

17. The method as recited in claim 16, further comprising the steps of:
determining a minimum amplitude from the compared spatial, temporal, and luminance values; and
predicting a masking quality for each of the spatiotemporal regions based, at least in part, on the determined minimum amplitude.

18. The method as recited in claim 16, further comprising the steps of:
determining a maximum amplitude from the compared spatial, temporal, and luminance values;
determining that each of the mapped values at least equals a predetermined amplitude threshold; and
predicting a masking quality for each of the spatiotemporal regions based, at least in part, on the determined maximum amplitude.

19. A non-transitory computer readable storage medium comprising code stored therewith, which when executing on one or more processors, causes the processors to perform a method that comprises the steps of:
computing a magnitude of a desired distortion, introduced into the frames of a video sequence with at least one of a watermarking process or a compression process, which is below a threshold of human visual perception;
within each local spatiotemporal region of the video frames, counting a number of points that have an amplitude of information related to a feature of the regions that at least equal the computed imperceptible distortion magnitude;
in each of the local spatiotemporal regions, computing a fraction of the points, which have feature information magnitudes that at least equal the computed imperceptible distortion magnitudes, in relation to the total number of points;
comparing the computed fractions to a specified threshold value; and
identifying one or more of the local spatiotemporal regions with fractions that equal or exceed the specified threshold value.

20. The non-transitory computer readable storage medium as recited in claim 19 further comprising code, which when executing on the one or more processors, causes the processors to perform the method, which further comprises the steps of:
analyzing one or more aspects, which relate to visual perception, of at least one feature of each of the identified spatiotemporal regions;
computing a salience factor for each of the aspects, in relation to a probability of attracting human visual attention therewith;
comparing the salience factor to a specified salience threshold; and
further identifying one or more of the local spatiotemporal regions with salience factors that equal or exceed the specified salience threshold.

21. A system, comprising:
means for computing a magnitude of a desired distortion, introduced into the frames of a video sequence with at least one of a watermarking process or a compression process, which is below a threshold of human visual perception;

means for counting, within each local spatiotemporal region of the video frames, a number of points that have an amplitude of information related to a feature of the regions that at least equal the computed imperceptible distortion magnitude;
means for computing, in each of the local spatiotemporal regions, a fraction of the points, which have feature information magnitudes that at least equal the computed imperceptible distortion magnitudes, in relation to the total number of points;
means for comparing the computed fractions to a specified threshold value; and
means for identifying one or more of the local spatiotemporal regions with fractions that equal or exceed the specified threshold value.

22. The system as recited in claim 21, further comprising:
means for analyzing one or more aspects, which relate to visual perception, of at least one feature of each of the identified spatiotemporal regions;
means for computing a salience factor for each of the aspects, in relation to a probability of attracting human visual attention therewith;
means for comparing the salience factor to a specified salience threshold; and
means for further identifying one or more of the local spatiotemporal regions with salience factors that equal or exceed the specified salience threshold.

* * * * *